United States Patent [19]

Malcolm et al.

[11] 4,083,239
[45] Apr. 11, 1978

[54] PERIPHERAL VISION HORIZON DEVICE

[75] Inventors: Richard Malcolm, Oakville; Philip Anderson, Laurel; Kenneth E. Money, Willowdale; Walter Mandler, Midland, all of Canada

[73] Assignee: Canadian Minister of National Defence, Ottawa, Canada

[21] Appl. No.: 749,867

[22] Filed: Dec. 13, 1976

Related U.S. Application Data

[63] Continuation-in-part of Ser. No. 636,467, Dec. 1, 1975, abandoned.

[51] Int. Cl.² .............................................. G01C 21/00
[52] U.S. Cl. ............................ 73/178 R; 116/114 R; 356/252
[58] Field of Search .................. 116/114 R, DIG. 43, 116/129 R; 73/178 R, 178 T, 178 H; 356/251, 252, 248; 353/13, 14; 33/378

[56] References Cited

U.S. PATENT DOCUMENTS

2,887,927  5/1959  Newton ............................... 356/252
3,282,242  11/1966  Wrestler, Jr. ...................... 116/114 R

*Primary Examiner*—Donald O. Woodiel
*Attorney, Agent, or Firm*—Beveridge, DeGrandi, Kline & Lunsford

[57] ABSTRACT

The invention provides a peripheral vision horizon device for use in projecting a light bar on the interior of an aircraft cockpit or the like to indicate pitch and roll, the light bar being located with reference to a datum in the cockpit. The device includes a housing having a first part attachable to the cockpit and a second part rotatably coupled to the first part for movement about a first axis which on assembly in the aircraft extends transversely of the cockpit. A lens carrier is rotatably coupled to the second part for rotation about a second axis which is at right angles to the first axis. A light source is contained in the housing and an optical system is coupled to the housing for directing light from the light source towards the lens carrier along the second axis. A lens of two-fold symmetry is mounted in the lens carrier transversely of the second axis for receiving said light and projecting a beam of light which strikes the interior of the cockpit to create the light bar. Control means are also coupled to the housing, the control means being operable to move the second part about the first axis to indicate pitch and to move the lens carrier about the second axis to indicate roll. Consequently, deviation of the position of the light bar from the datum will indicate the orientation of the aircraft relative to a horizontal plane containing the light bar.

17 Claims, 12 Drawing Figures

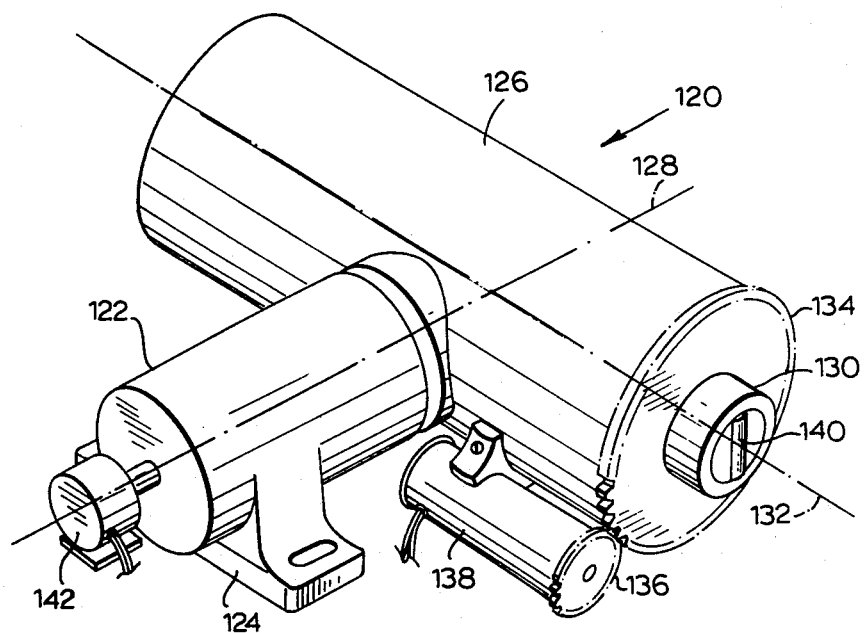
FIG.8
  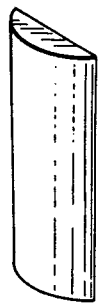  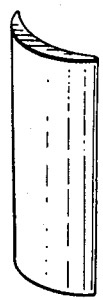
FIG.4  FIG.5  FIG.6

PERIPHERAL VISION HORIZON DEVICE

This application is a continuation-in-part of patent application Ser. No. 636,467, filed on Dec. 1, 1975, now abandoned.

This invention relates to an artificial horizon device for use in projecting a light bar on the interior of an aeroplane cockpit or the like to indicate the true position of the horizon with reference to a datum in the cockpit.

Although the following description will be related specifically to the problems associated with flying aircraft, it will be appreciated that any vehicle which moves three dimensionally requires some reference to which position and movement can be related. In an aircraft it is convenient to use the horizon to relate the position of the aeroplane to a horizontal plane in which the aircraft would travel in horizontal flight. Similarly, the position of a submarine must also be related to a horizontal plane. Instruments which indicate deviation from a horizontal plane are commonly called "artificial horizon instruments" and the present invention provides a device which fulfils the function of such an instrument.

When a pilot is flying an aircraft, gravity effects are modified by centrifugal forces so that the pilot cannot rely on his senses to indicate whether or not the aircraft is pitching or rolling. It is therefore necessary to provide the pilot with an artificial horizon instrument which indicates both pitch and roll. In darkness or stormy weather, the pilot must refer directly to the relatively small artificial horizon instrument at the expense of other instruments to ensure that the aircraft is maintained in the correct orientation required for flight in a particular direction. This time sharing of instruments makes smooth control difficult and the problem is emphasized during turbulence when motion of the pilot relative to the instrument panel causes blurring of vision.

Periodic reference to the artificial horizon instrument is undesirable because it has been found that is some circumstances a pilot's senses will tell him that the aircraft is performing a particular manoeuvre whereas when he refers to the instrument he is informed that his senses are wrong and that the aeroplane is in another manoeuvre. There is then a natural desire for the pilot to believe his senses rather than the instrument. Although the pilot is trained to rely entirely on the instrument, there have been instances of pilots disregarding the instrument and relying on their senses. It would therefore be preferable to provide an artificial horizon device which is readily viewed irrespective of whether or not the pilot is concentrating on another instrument.

Another disadvantage of conventional artificial horizon instruments is that the angle they subtend to the pilot's eye is sufficiently small that they are primarily read by the pilot's foveal or central vision. Such vision is relatively poor at sensing movement and it would therefore be preferable to have the movement read (or at least sensed) by the pilot's peripheral vision which is better suited to sensing movement. To this end, peripheral vision horizon devices have been proposed which project a wide band or bar of light in front of the pilot without displacing any of the other instruments. This light bar is centered in front of the pilot such that as the plane pitches and rolls, the light bar moves accordingly to indicate where the horizon would be. This movement is processed by the normal neural circuits usually associated with the maintenance of equilibrium. Consequently, because the light bar is always displayed to the peripheral vision (irrespective of what the foveal vision is viewing) there is no time during which the pilot is forced to ignore the light bar and begin to rely on his inertial senses. There is therefore less likelihood of the pilot overruling the devices.

Another advantage of peripheral vision horizon devices is that because of the size of the display, motion of the pilot relative to the instruments (as during turbulence) will not degrade interpretation of the instrument significantly.

Various attempts have been made to provide equipment which would provide an artificial horizon in the form of a light bar. One example is found in U.S. Pat. No. 3,282,242 to C. G. Wrestler, Jr. In this patent, an instrument is provided having a light projector in a housing and including a light box at a lower portion of the housing. A lamp component is in the light box and there is a cover on the housing. The housing has an elongated narrow slot adjacent the cover and means are provided in the housing to project a thin wide beam of light through the slot. The control is gyroscopic. In this structure, a proportion of the light is lost due to the arrangement of the reflector on the axis of the optical system and also because the use of a mechanical slot is necessary to control the width of the band of light. Consequently, a large proportion of the light would be lost with resulting inefficiency and the need for a larger light source which would possibly create heat problems.

A further example of an instrument which provides a light bar is found in a publication of the National Technical Information Service of the U.S. Department of Commerce. The publication is entitled "A Prototype Peripheral Vision Aircraft Attitude Display" and was published by William R. Williamson in October, 1966. The structure in this publication includes a light transmitting source which develops a fine intense light at a slot and this is then projected by way of a condensing lens and projecting lens onto a surface coated mirror. The arrangement tends to be somewhat complex optically.

The purpose of the present invention is to provide a peripheral vision horizon device which provides a relatively intense light bar without excessive optical losses.

Accordingly, the invention provides a peripheral vision horizon device for use in projecting a light bar on the interior of an aircraft cockpit or the like to indicate pitch and roll, the light bar being located with reference to a datum in the cockpit. The device includes a housing having a first part attachable to the cockpit and a second part rotatably coupled to the first part for movement about a first axis which on assembly in the aircraft extends transversely of the cockpit. A lens carrier is rotatably coupled to the second part for rotation about a second axis which is at right angles to the first axis. A light source is contained in the housing and an optical system is coupled to the housing for directing light from the light source towards the lens carrier along the second axis. A lens of two-fold symmetry is mounted in the lens carrier transversely of the second axis for receiving said light and projecting a beam of light which strikes the interior of the cockpit to create the light bar. Control means are also coupled to the housing, the control means being operable to move the second part about the first axis to indicate pitch and to move the lens carrier about the second axis to indicate roll. Consequently, deviation of the position of the light bar from the datum will indicate the orientation of the aircraft relative to a horizontal plane containing the light bar.

The invention will be better understood with reference to the drawings, in which:

FIGS. 4 to 6 illustrate three different embodiments of cylindrical lenses suitable for use in this embodiment of the device;

FIG. 8 is a somewhat diagrammatic perspective view of another embodiment of the device;

Figure 1:
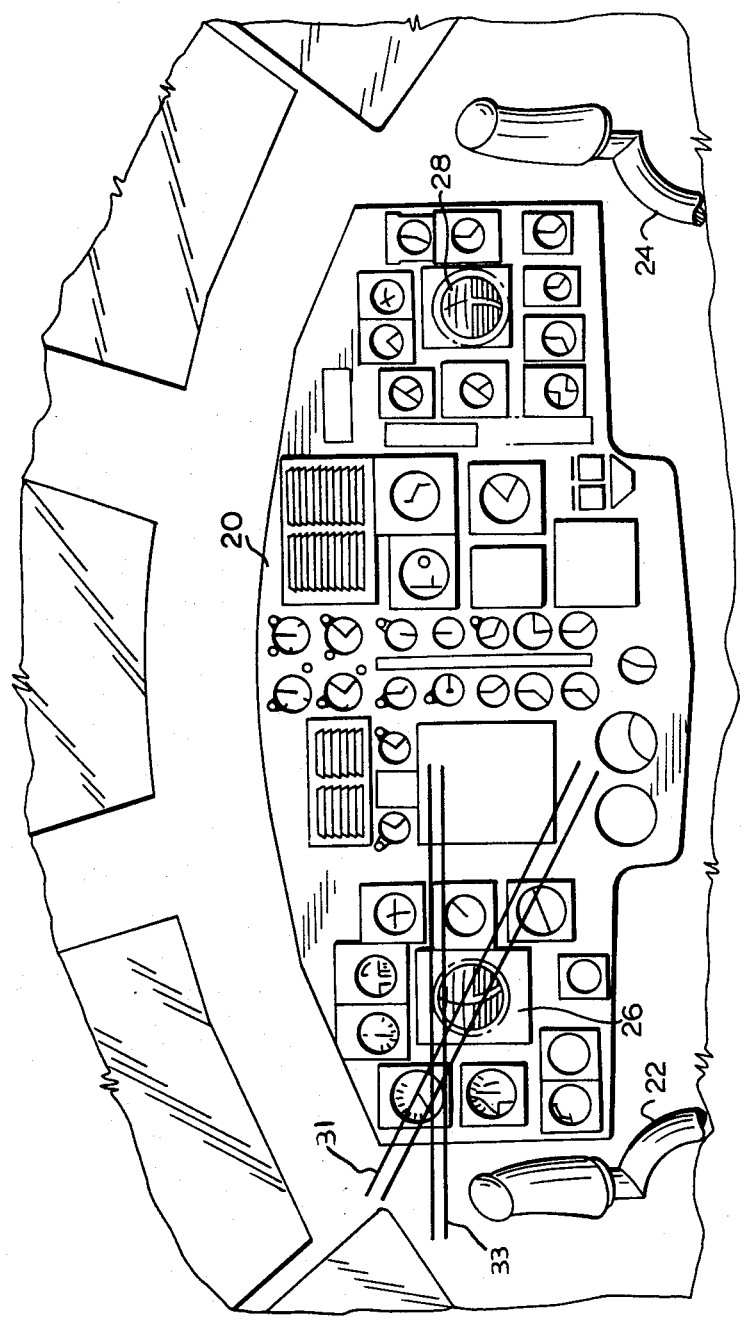
FIG. 1 is a diagrammatic perspective view of an instrument panel in the cockpit of an aircraft.

Reference is first made to FIG. 1 which illustrates an instrument panel 20 for use by a pilot and co-pilot who will sit behind the respective controls 22, 24. The instruments to the left of the centre of the panel are generally duplicated to the right so that either one of the pilot and co-pilot can control the aircraft. The instrument panel includes duplicate artificial horizon instruments 26, 28 which are normally found in an instrument panel of this type and which advise the pilot of the pitch and roll of the aircraft relative to a horizontal plane. These instruments are relatively small and must be viewed carefully by the pilot so that the pilot must avert his eyes from the windshield and from other instruments while he reads the artificial horizon instrument.

FIG. 1 also illustrates two positions of a light bar created by a device according to the invention and which will be described with reference to subsequent FIGS. The two positions are indicated by numerals 31, 33. In position 31, the light bar is centered on the artificial horizon instrument 26 which acts as a datum in this particular arrangement. Consequently, the aircraft is maintaining level flight with the left wing down. By contrast, the light bar 33 indicates that the aircraft has its nose down in a descent while travelling with wings level. This is apparent primarily because the instruments in the instrument panel 20 are framed in rectangles having horizontal and vertical sides. Consequently, the arrangement lends itself to indicate whether or not the light bar 33 is horizontal with respect to the panel 20 and hence whether or not the aircraft is rolling. Similarly, the fact that the light bar 31 is inclined with respect to the instruments indicates that the aircraft is rolling and in which direction. In some aircraft, the instruments will not have rectangular faces but they are generally arranged in a row which is horizontal. In the unlikely event that the aircraft with which the device is to be used does not have instruments in such an arrangement, then the datum would have to be added to the instrument panel. This would have to be done in the form of a line or series of lines extending horizontally in the instrument panel with a particular line indicating that the aircraft is in level flight.

It will be evident that two light bars must be provided in an aircraft if the co-pilot is also to use the light bar. This is because a light bar which extended across the whole instrument panel would tilt down at one side and up at the other side when the aircraft rolled and consequently the pilot and co-pilot will have different information from the light bar. Two light bars can be provided either by using two peripheral vision horizon devices of the types to be described or by using one such device with suitable optics which either splits the light into two images or which allows the light bar to be focussed either in front of the pilot or in front of the co-pilot.

Figure 2:
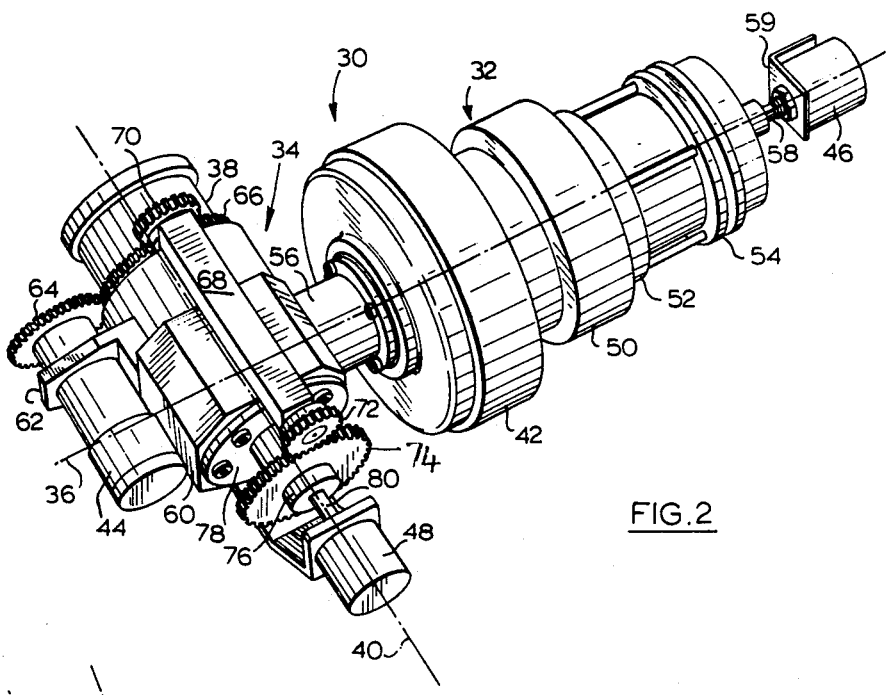
FIG. 2 is a perspective view of a first embodiment of a peripheral vision horizon device according to the invention.
Figure 3:
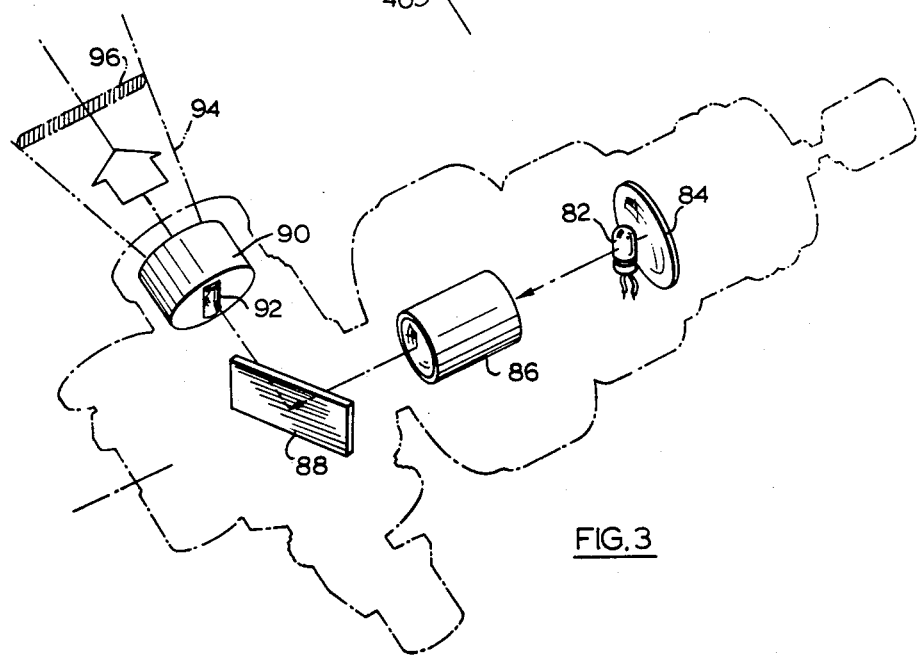
FIG. 3 is a diagrammatic view showing the device in ghost outline and illustrating an optical arrangement within the device.

The structure of the device will now be described with reference initially to FIG. 2 and with subsequent reference to FIG. 3. As seen in FIG. 2, a peripheral vision horizon device includes a housing designated generally by the numeral 30 and including a first part 32 for attachment to the aircraft cockpit or the like and a second part 34 rotatably coupled to the first part 32 for rotation about a first axis 36. The second part 34 includes a lens carrier 38 which is rotatable about a second axis 40 so that in operation, rotation about the first axis 36 is equivalent to aircraft pitch whereas rotation about the axis 40 corresponds to aircraft roll.

As will be described with reference to FIG. 7, the device shown in FIG. 2 is controlled from a gyro platform which is associated with a control circuit having outputs to a pitch control motor 42 and roll control motor 44. Rotation by these motors is sensed by respective readers 46, 48 which form part of the control system as will be described with reference to FIG. 7.

The mechanical movements created by the respective motors 42, 44 will now be described with reference to FIG. 2. Motor 42 is positioned concentrically about the first axis 36 and is attached to a main light baffle 50 which in turn is attached to a lamp holder 52. A fan and motor assembly 54 is built concentrically about the axis 36 and attached to the lamp holder 52 for cooling a lamp in the holder by blowing air past the lamp axially. The pitch control motor 42 drives a tubular main shaft 56 which is associated with the second part 34, and an extension 58 of this shaft projects outwardly from the fan and motor assembly 54. The extension 58 terminates at the reader 46 which is attached by a bracket 59 to the cockpit. Consequently movement of the shaft 56 is transmitted by extension 58 to the reader 46 for use in controlling the device as will be described.

The tubular main shaft 56 is attached rigidly to a secondary housing 60 of the second part 34. A bracket 62 extends from the housing and supports the motor 44 which drives a pinion 64. This pinion is in mesh with a gear wheel 66 located concentrically about the second axis 40 and attached to the lens carrier 38 for rotating the carrier 38. A layshaft assembly 68 is attached to the secondary housing 60 and extends axially between ganged similar gears 70, 72 which transmit movement from the gear wheel 66 to a similar gear wheel 74 which is also located about the axis 40. The gear wheel 74 is mounted on a shaft 76 dependent from a bearing assembly 78 attached to the housing 60. An extension 80 of the shaft 76 is coupled to the reader 48 so that movement of the lens carrier 38 is transmitted by way of the layshaft assembly 68, gear wheel 74, shaft 76 and extension 78 to the reader 48.

It will be appreciated that suitable bearings are provided to permit the shaft 56 to rotate, and also to permit the lens carrier 38 to rotate relative to the housing 60. Also, the second part 34 is balanced about axis 36 to equalize start-up loads on the motor 42.

The internal parts of the device described with reference to FIG. 2 will now be described with reference also to FIG. 3. A ghost outline of the device is shown in FIG. 3 so that the relative positions of the optical elements shown in FIG. 3 can be related to FIG. 2. As seen from a comparison of these FIGS., the lamp holder 52 contains a light source 82 positioned in front of a spherical concave reflector 84. Light from source 82 travels towards an internal lens assembly 86 on the first axis 36. Light leaving this lens assembly passes through the tubular main shaft 56 and strikes a planar reflector 88 lying at 45° to both the axes 36 and 40. Consequently, light from the lens assembly 86 is deflected by the reflector 88 towards a lens holder 90 in the carrier 38. The light then meets a cylindrical lens 92 in the holder 90 to convert light which is distributed concentrically about the axis 40 into a flat beam 94 which creates a light bar 96. It will be understood that the light bar can take up an infinite number of positions, two of which were described with reference to numerals 31 and 33 in FIG. 1.

The angle of divergence of the flat beam 94 will be controlled by the focal length of the lens 92 whereas the thickness of the beam will be controlled by the power of lens 86 and size of light source 82.

The illumination created by the device is relatively intense because of the fact that substantially all of the light is used from the light source 82, and this light is intensified into a flat beam by the use of the cylindrical lens 92. In this embodiment, the light source is a SHORT Xenon Arc light source made by PEK of Sunnyvale, California, U.S.A. and sold under the serial number X-36. This light source is of 35 watts power and a larger 75 watts light source also made by PEK and sold under the serial number X-76 has also been used successfully.

The preferred embodiment of the device described with reference to FIGS. 2 and 3 also includes an indication of whether or not the aeroplane is the right way up or upside-down. This is done by tinting the cylindrical lens 92 along either the upper or lower extremity so that the light bar 96 is coloured at one of its edges. If preferred, this could be done in other ways such as by using a filter or a prism in the optical system.

The term "cylindrical lens" is intended to include any lens having two two-dimensional optical surfaces which provide a constant cross-section along the length of the lens. Examples of such lenses are illustrated in FIGS. 4 to 6. The lens in FIG. 5 includes one surface which is flat. However, such cylindrical lenses are typical of many lenses which can be used in an optical system such as that described. In general these lenses are examples of lenses having "two-fold symmetry". This term is used to describe any lens which firstly can be bisected by only two planes to provide in each instance two parts which are the mirror images of one another and which secondly is capable with a suitable light source (which could include other lenses) to provide a light bar such as that described. Further examples of such lenses are toroidal lenses and lenses having one surface which is cylindrical and the other which is spherical.

Figure 7:
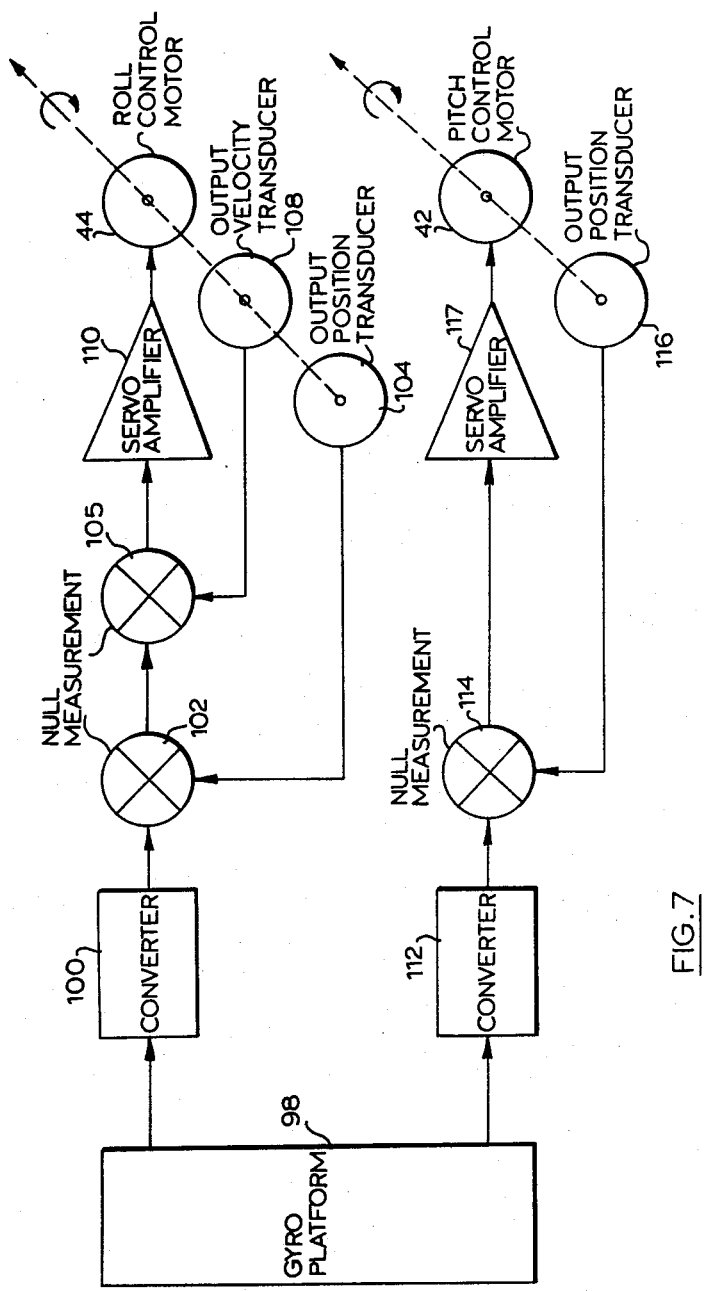
FIG. 7 is a block diagram of circuitry used in controlling the movements of the device.

Reference is now made to FIG. 7 which illustrates a control system used in driving the roll control motor 44 and the pitch control motor 42. A gyro platform 98 develops two signals, a first of which corresponds to aircraft pitch. The first signal is fed to a converter 100 to create a direct current signal which is then fed to a null measurement circuit 102. This circuit also receives input from an output position transducer 104 which forms part of the reader 48 shown in FIG. 2. A signal from the output position transducer is compared with the signal from the converter 100 to create a further signal which is fed to another null measurement circuit 105. The signal fed into the circuit 105 from the null measurement circuit 102 is proportional to angular velocity of the roll control motor and this is compared with a similar signal from an output velocity transducer 108 which also forms part of the reader 48 of FIG. 2. Subsequently, a further signal is fed from the circuit 105 to a servo amplifier 110 which develops a signal sufficient to drive the roll control motor 44.

A signal from the gyro platform corresponding to pitch is fed into a further converter 112 which creates a direct current signal for a null measurement circuit 114. This circuit compares a feedback signal from an output position transducer 116 in the reader 46 of FIG. 2. Subsequently a signal is then fed from the null measurement circuit 114 to a servo amplifier 117 for driving the pitch control motor 42.

In use, the light bar described with reference to FIG. 1 can be set up by adjustment of the device in the aircraft so that the datum is any convenient part of the instrument panel or surrounding portions of the cockpit. However, the center of the light bar should be at a position in front of the pilot so that the correct sense of roll will be conveyed to the pilot. As the pilot flies the aircraft, he is continually aware of the real horizon in daylight. Similarly, when the peripheral vision horizon device is used in bad weather or at night, the pilot is similarly aware of a light bar representing the real horizon. The peripherally viewed horizon is sensed in the same way that the real horizon is seen and provides a very compelling source of information about the relationship of the aircraft to the outside world. The possibility of a pilot making an error because his senses deceive him is reduced, and also the pilot is free to concentrate on other instruments because his peripheral vision will make him continuously aware of the attitude of his craft.

Reference is now made to FIG. 8 which illustrates somewhat diagrammatically an alternative embodiment of the device shown in FIG. 2. The device includes a housing 120 having a first part 122 including a pitch control motor and adapted to be attached to an aircraft cockpit or the like by a pedestal 124. A second part 126 is rotatably coupled to the first part 122 for movement by the pitch control motor about a first axis 128. The second part 126 includes a lens carrier 130 which is rotatable about a second axis 132 and includes a gear wheel 134 which is in engagement with a pinion 136. This pinion is driven by a roll control motor 138 attached to the side of the second part 126.

The second part 126 is essentially a laser emitter assembly aligned with the lens carrier 130 for directing a light beam to a lens 140 of two-fold symmetry in the lens carrier 130. Consequently, a light bar is projected in alignment with the axis 132 and this bar is moved as previously described with reference to an earlier embodiment and driven by the respective pitch control and roll control motors. As drawn, the angular position of the second part 126 about axis 128 is sensed by a reader 142 and the roll control motor 138 includes a sensor for determining the angular position of the lens carrier 130 about the second axis 132. The control system used would be similar to that described with reference to FIG. 7.

The intensity of illumination from the laser beam can be above normally accepted limits initially because it is subsequently scattered by the lens 140 so that the light falling on a particular area is then within accepted limits. A ruby laser has proven to be desirable because it produces a reddish light which is particularly acceptable to a pilot. Because a laser beam is monochromatic, the light bar cannot be coloured in the same way as light bar 96 (FIG. 3) although the same result can be achieved by deforming the lens slightly at its centre to indicate which is the top of the light bar.

The optical systems described with reference to the embodiments shown in the drawings can be varied consistent with the inventive concept. For instance, any light system which produces a suitable beam of light directed at either the lens 92 (FIG. 3) or the lens 140 (FIG. 8) would be within the scope of the invention. In general therefore any optical system contained in the housing of the device would be suitable provided that such a system combined with a lens of two-fold symmetry as shown in the illustrated embodiments.

Figure 9:
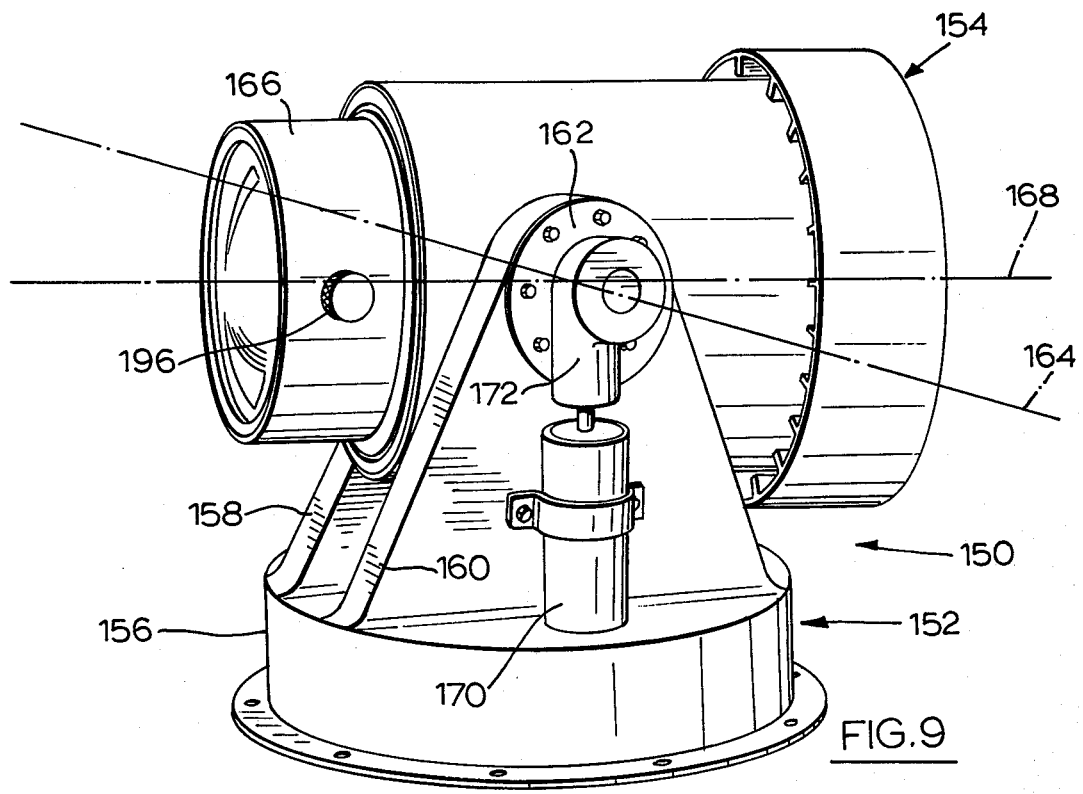
FIG. 9 is a perspective view of a third embodiment of the device.

A further embodiment is illustrated in FIGS. 9 to 12 and reference is made initially to FIG. 9 to describe this embodiment. As seen in this FIG. 9 a housing 150 includes a first part 152 and a second part 154. The first part includes a pedestal mounting 156 having a pair of spaced upright supports 158, 160 which include respective aligned bearings 162 (one of which is seen) to support the second part 154. These bearings permit the second part to be rotated about a first axis 164 and, as will be explained with reference to FIG. 10, the first part 154 includes a lens carrier 166 rotatable about a second axis 168. Control about the first axis 164 is provided by a drive motor 170 connected by a right-angle gear box 172 attached to a stub axle on the side of the second part 154. A similar and aligned stub axle is provided on the opposite side of the part 154 and connected to a position reader in similar fashion to the reader 46 shown in FIG. 2. These parts are not shown in FIG. 9 or 10 because of their similarity to the parts previously described with reference to the first embodiment.

Figure 10:
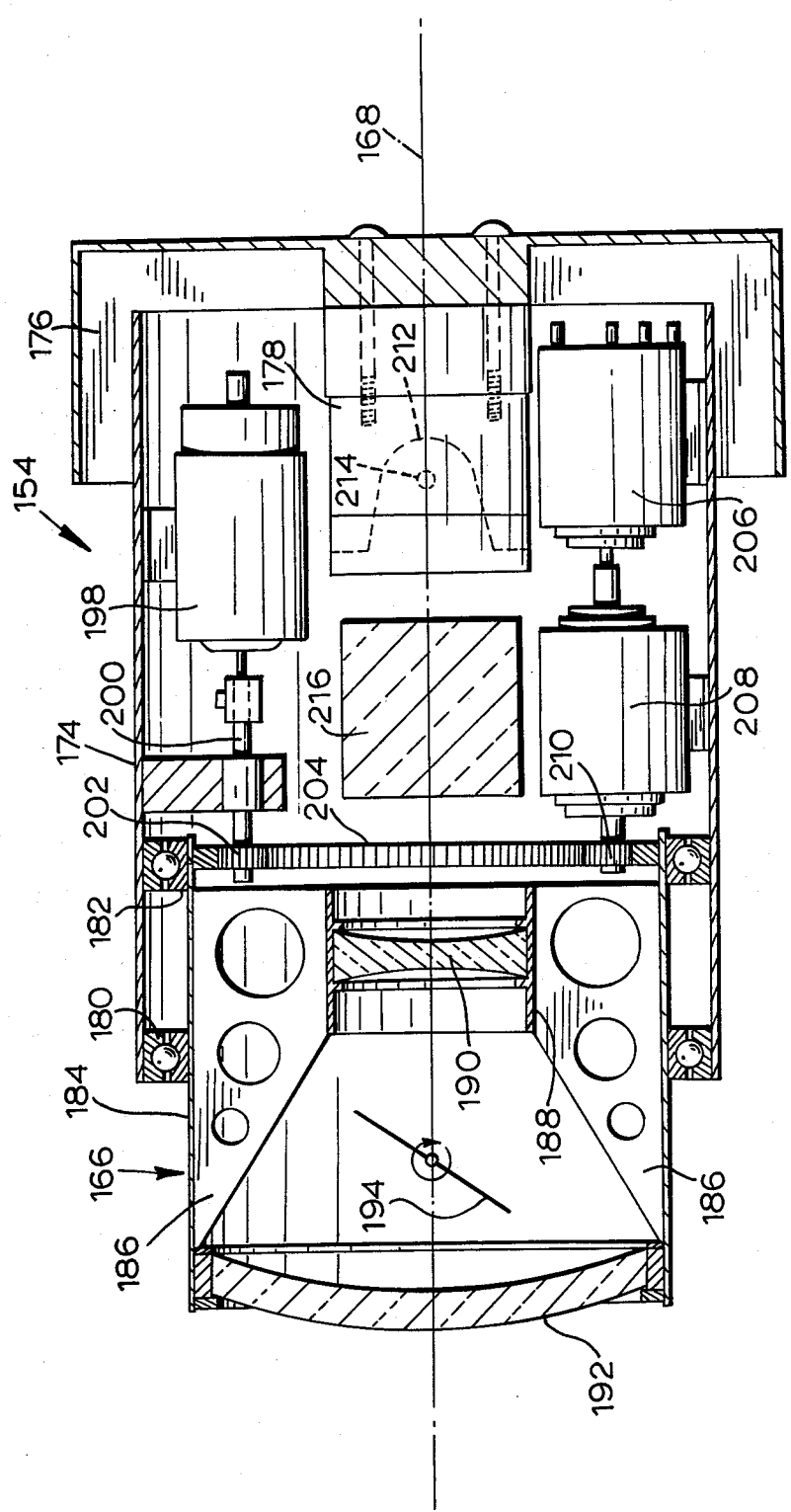
FIG. 10 is a somewhat diagrammatic sectional view on line 10—10 of FIG. 9 showing a second part of the third embodiment.

Reference is now made both to FIGS. 9 and 10 with particular reference to FIG. 10 to describe the second part 154. It will be seen in FIG. 10 that the second part 154 includes a tubular main body 174 attached at a first of its ends to a finned end cap 176 formed to dissipate heat generated from a plasma arc light source 178. This light source is of a type sold by Varian Corporation, Eimac Division. The light source is a type VIX 150F 150 watt Xenon illuminator. In general any equivalent small, rugged, integral-reflector, high-pressure short arc-illuminator would be satisfactory.

At the other end of the main body 174, a pair of ball bearing assemblies 180, 182 are contained within the body 174 and assembled about the lens carrier 166 to permit rotation of this carrier relative to the body 174. The lens carrier 166 includes an outer sleeve 184 engaged in the bearings and containing radial spacers 186 attached at their inner extremities to a lens holder 188 which is concentric with the outer sleeve 184 and contains a negative or diverging lens 190.

The outer sleeve 184 of the lens carrier 166 terminates at its forward extremity in support for a positive or converging lens 192 of two-fold symmetry. Also within the lens carrier 166 a simple rotatable flap 194 is provided as part of a light intensity control mechanism having a control knob 196 (FIG. 9) on the outside of the sleeve 184. The purpose of this mechanism will be described in more detail later.

The lens carrier 166 can be rotated relative to the main body 174 using a roll control motor 198 which is connected by a suitable drive shaft 200 to a drive pinion 202 which is in mesh with an internally toothed ring gear 204 attached internally to the outer sleeve 184. The position of the lens carrier 166 relative to the body 174 is sensed by a reader 206 attached by way of a gear box 208 to a driven pinion 210 which is in mesh with the ring gear 204.

Figure 11:
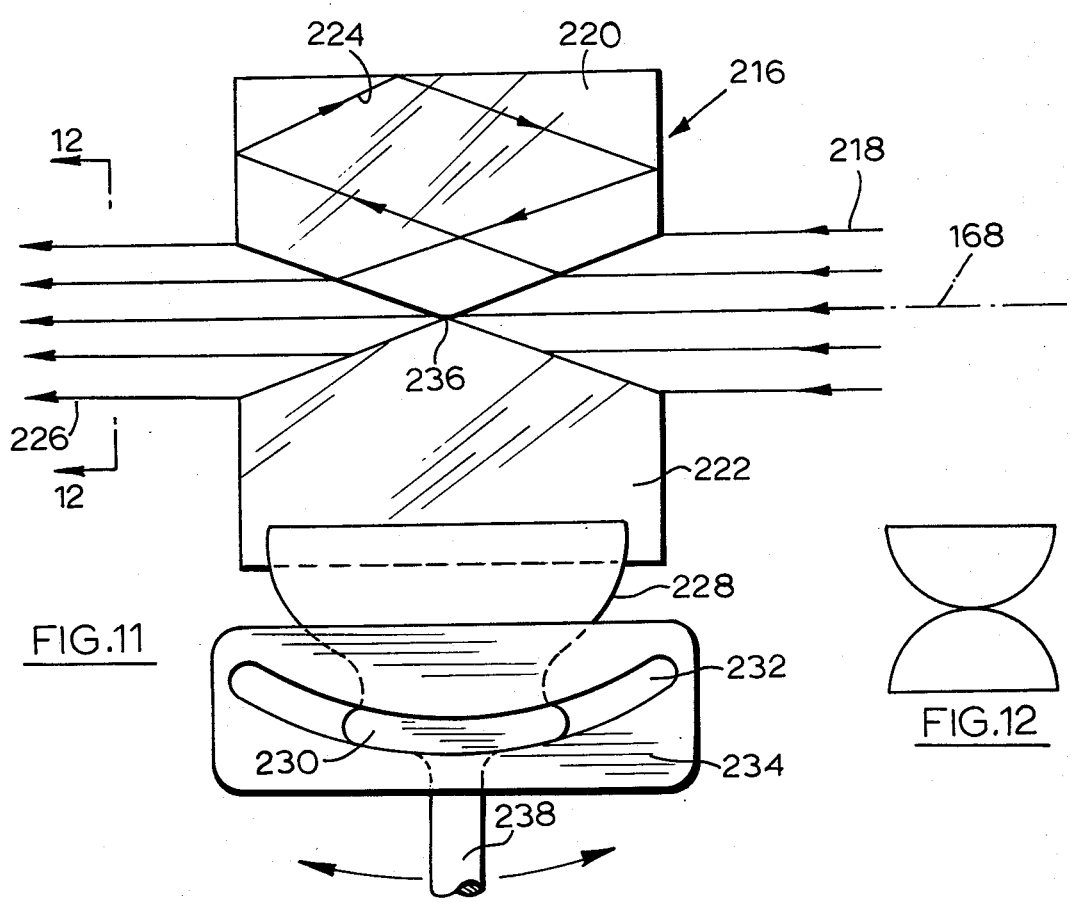
FIG. 11 is a schematic view of some of the optical parts of the third embodiment.

The light source 178 includes a parabolic reflector 212 which receives light from a plasma arc 214 and directs the light towards a prism assmebly 216 which will be more fully described with referece to FIG. 11. After leaving the assembly 216 the light then passes through the negative lens 160, past the intensity control mechanism 194 and is then focused as a light bar such as those illustrated in FIG. 1.

Before describing the structure of the prism assembly 216, the reason for having this assembly in the optical system will be discussed. It will be understood that light leaving the parabolic reflector 212 will include rays which are not parallel to the axis 168. Consequently, it is necessary to provide a substantial space between the reflector 212 and the first lens of the system in order that scattered light will be lost and the light reaching the lens will be primarily parallel to the axis 168. This is done so that the projected light bar has clearly defined edges. If this distance was provided directly between the lens 190 and the reflector 212 the unit would be longer than that shown in FIG. 10. The prism assembly creates an extended path for the light which allows the assembly to be shorter and consequently more acceptable.

Figure 12:
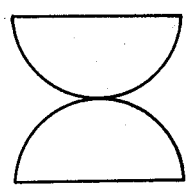
FIG. 12 is a diagram showing a cross-section on line 12—12 of FIG. 11 of a light beam used in the third embodiment.

FIG. 11 illustrates the extended light path provided by the prism assembly 216. Light rays 218 leaving the reflector 212 (FIG. 10) meet respective first and second prisms 220, 222 and are internally reflected within the prisms as indicated by a single ray 224. Because each of the rays is reflected an odd number of times, the resulting beam 226 leaving the assembly 216 has a cross-section as shown in FIG. 12. This cross-section is particularly desirable because the centre of the beam contains rays which were originally at the periphery of the beam leaving the reflector 212 (FIG. 10) and which are less well aligned with the axis 168. When the beam 226 is diverged by the lens 190 the central portion of the beam can be occluded by the flap 194 leaving what was originally the central portion of the beam to be focused by the lens 192. Consequently, the shape of the beam permits the flap to be used without losing that part of the beam which is best defined and best aligned for focusing. Without the prism assembly it would be preferable to occlude the beam from the outside of the beam rather than the centre in order to obtain the same results. Such an arrangement would be more complex than that shown in FIG. 10 and athough it would no doubt operate satisfactorily, the arrangement shown in FIG. 10 is advantageous over such a structure.

The prism assembly 216 has yet a further advantage. As shown in FIG. 11, the prism 222 is attached to a connector 228 having a pair of slider portions 230 (one of which is seen) riding in respective curved slots 232 in fixed elements 234. These slots 232 are radiused from the apex 236 of the prism 222 so that if a lever 238 forming an extension of the connector 228 is moved the effect is to rotate the prism 222 about the apex 236. An angular movement of the prism 222 will result in deflecting the portion of the beam leaving this prism through twice that angle and it is possible using this control to superimpose the lower half of the beam shown in FIG. 12 on the upper half by adjusting the position of the prism 222 relative to the prism 220. Consequently, the width of the resulting light bar can be varied from a maximum width to a minimum width which is half that of the maximum width. The intensity will of course vary also as the width is varied.

The embodiments shown illustrate various optical systems and structures which will project a light bar within the cockpit of an aircraft or other similar vehicle moving three dimensionally. It will be evident that many optical systems can be used within the scope of providing a final lens or lens combination in the system which has the properties of a lens of two-fold symmetry as herein described.

When an aeroplane rolls through 360° the lens of two-fold symmetry in the embodiments described will also rotate about the second axis through one revolution whereas the light source will remain fixed relative to this axis. It is therefore desirable to have a light source which is intense, small and symmetrical about the second axis so that as the lens rotates the quality, width and general appearance of the light bar remains constant. Where an aircraft is expected to execute full rolls there are advantages in having the light source fixed relative to the second axis, primarily because if it moved it would have to be connected electrically by slip-rings. However, it is within the scope of this invention to provide such slip-rings and to connect the light source to the lens carrier so that the carrier, optical system, lens and light source all move about the second axis as a unit. The term "lens carrier" is intended to include such a structure. In FIG. 10 for instance, with workshop changes the sleeve 184 could be modified and extended rearwardly to contain all of the optical parts including the light source 178.

Because light sources now available are not as small as to be point sources and because they tend not to be symmetrical about the second axis, the quality of the light bar will vary as the lens is rotated relative to the fixed light source. Some aircraft are not designed to roll and there is then no need for slip-rings because a simple flexible electrical connector can be used to permit limited rotation of the complete optical system about the second axis. Such an arrangement would also be within the scope of the invention.

What we claim is:

1. A peripheral vision horizon device for use in projecting a light bar onto the interior of an aircraft cockpit or the like to indicate pitch and roll with reference to a datum in the cockpit, the device comprising:
    a housing having a first part attachable to the cockpit and a second part rotatably coupled to the first part for movement about a first axis which on assembly in the aircraft extends transversely of the cockpit;
    a lens carrier rotatably coupled to the second part for rotation about a second axis, the second axis being at right angles to the first axis;
    a light source contained in the housing;
    an optical system coupled to the housing for directing light from the light source towards the lens carrier along the second axis;
    a lens of two-fold symmetry mounted in the lens carrier transversely of the second axis for receiving said light and projecting a beam of light for striking the interior of the cockpit to create the light bar; and
    control means coupled to the housing, the control means being operable to move the second part about the first axis to indicate pitch and to move the lens carrier about the second axis to indicate roll so that deviation of the position of the light bar from said datum will indicate the orientation of the aircraft relative to a horizontal plane containing the light bar.

2. A peripheral vision horizon device as claimed in claim 1 in which the optical system and the lens include means to provide a colour variation across the thickness of the light bar to indicate whether or not the aircraft is upside-down.

3. A peripheral vision horizon device as claimed in claim 1 in which the light source is a laser emitter.

4. A peripheral vision horizon device as claimed in claim 3 in which the lens includes a central deformation so that the light bar has a minor distortion to indicate whether or not the aircraft is upside-down.

5. A peripheral vision horizon device as claimed in claim 1 in which the light source is in the first part and in which the optical system includes a lens assembly in the first part for directing light from the light source along the first axis towards the second part, and a planar mirror at the intersection of the first and second axes for deflecting the light along the second axis towards the lens.

6. In a peripheral vision horizon device for use in projecting a light bar onto the interior of an aircraft cockpit or the like to indicate pitch and roll with reference to a datum in the cockpit, and including:
    a housing having a first part attachable to the cockpit and a second part rotatably coupled to the first part for movement about a first axis which on assembly in the aircraft extends transversely of the cockpit;
    a lens carrier rotatably coupled to the second part for rotation about a second axis which is right angles to the first axis;
    a light source contained in the housing, and an optical system coupled to the housing for directing light from the light source towards the lens carrier along the second axis; and
    control means coupled to the housing and operable to move the second part about the first axis to indicate pitch and to move the lens carrier about the second axis to indicate roll, the improvement in which the device further comprises a lens of two-fold symmetry contained in the lens carrier and positioned transversely of the second axis for receiving light from the optical system and projecting a beam of light for striking the interior of the cockpit to create the light bar.

7. Apparatus as claimed in claim 6 in which the optical system and the lens include means to provide a colour variation across the thickness of the light bar to indicate whether or not the aircraft is upside-down.

8. A peripheral vision horizon device as claimed in claim 1 in which the light source and optical system are arranged in the second part for directing light to the lens.

9. A peripheral vision horizon device as claimed in claim 1 in which the lens of two-fold symmetry is a cylindrical lens.

10. Apparatus as claimed in claim 7 in which the lens of two-fold symmetry is a cylindrical lens.

11. A peripheral vision horizon device for use in projecting a light bar onto the interior of an aircraft cockpit or the like to indicate pitch and roll with reference to a datum in the cockpit, the device comprising a housing having a first part attachable to the cockpit and a second part rotatably coupled to the first part for movement about a first axis which on assembly in the aircraft extends transversely of the cockpit;

a lens carrier rotatably coupled to the second part for rotation about a second axis, the second axis being at right angles to the first axis;

a light source contained in the second part on the second axis;

an optical system coupled to the housing for directing light from the light source towards the lens carrier along the second axis and including a prism assembly for extending the length of the light path;

a lens of two-fold symmetry mounted in the lens carrier transversely of the second axis for receiving said light and projecting a beam of light for striking the interior of the cockpit thereby creating the light bar; and control means coupled to the housing, the control means being operable to move the second part about the first axis to indicate pitch and to move the lens carrier about the second axis to indicate roll so that deviation of the position of light bar from said datum will indicate the orientation of the aircraft relative to a horizontal plane containing the light bar.

12. A peripheral vision horizon as claimed in claim 11 in which the prism assembly comprises a pair of prisms meeting on the second axis such that each of the prisms refracts and reflects half of the light meeting the prism assembly, each of the prisms reflecting the light by an odd number of reflections so that the light leaving the prisms is effectively inverted with respect to the light entering the prisms.

13. A peripheral vision horizon device as claimed in claim 12 and further comprising a flap rotatably mounted on a transverse axis which intersects the second axis at a position between the lens of two-fold symmetry and the prism assembly and operable to occlude a portion of the light projected towards the lens of two-fold symmetry to change the intensity of light leaving this lens.

14. A peripheral vision horizon device as claimed in claim 1 in which the light source is in the second part and attached to the second part on the second axis.

15. A peripheral vision horizon device as claimed in claim 1 in which the light source is coupled to the lens carrier and positioned on the second axis for rotation with the lens carrier about the second axis.

16. A peripheral vision horizon device as claimed in claim 11 in which the light source is contained in the second part and is fixed to the second part on the second axis.

17. A peripheral vision horizon device as claimed in claim 11 in which the light source and optical system are coupled to the lens carrier and positioned on the second axis for rotation with the lens carrier about the second axis.

* * * * *